United States Patent [19]
Kim

[11] Patent Number: 5,701,587
[45] Date of Patent: Dec. 23, 1997

[54] RADIO CALLING METHOD AND APPARATUS FOR REMOVING NEAR-FAR PROBLEM

[75] Inventor: Hae-Sug Kim, Suwon, Rep. of Korea

[73] Assignee: Samsung Electronics Co., Ltd., Suwon, Rep. of Korea

[21] Appl. No.: 668,070

[22] Filed: Jun. 17, 1996

[30] Foreign Application Priority Data

Jun. 17, 1995 [KR] Rep. of Korea ............... 16183/1995

[51] Int. Cl.[6] ................................... H04Q 7/38
[52] U.S. Cl. ............ 455/34.1; 455/34.2; 455/54.1; 455/56.1; 379/61
[58] Field of Search ................ 455/33.1, 34.1, 455/34.2, 53.1, 54.1, 54.2, 56.1, 62, 63, 67.1, 69, 161.1, 161.3; 379/59, 60, 61

[56] References Cited

U.S. PATENT DOCUMENTS

| | | | |
|---|---|---|---|
| 5,203,012 | 4/1993 | Patsiokas et al. | 455/34.1 |
| 5,204,970 | 4/1993 | Stengel et al. | 455/63 |
| 5,218,630 | 6/1993 | Patsiokas et al. | 455/34.1 |
| 5,276,906 | 1/1994 | Felix | 455/33.2 |
| 5,396,648 | 3/1995 | Patsliokas et al. | 455/34.1 |
| 5,406,614 | 4/1995 | Hara | 455/61 |
| 5,428,816 | 6/1995 | Barnett et al. | 455/56.1 |
| 5,465,397 | 11/1995 | Pickert | 455/56.1 |
| 5,499,386 | 3/1996 | Karlsson | 455/33.2 |
| 5,513,246 | 4/1996 | Jonsson et al. | 455/33.1 |

Primary Examiner—Reinhard J. Eisenzopf
Assistant Examiner—Thanh Le
Attorney, Agent, or Firm—Robert E. Bushnell, Esq.

[57] ABSTRACT

A radio calling method and apparatus for removing a near-far problem in a radio switching system groups a plurality of cordless fixed parts distributed in various areas into at least two groups. If a cordless portable part attempts an outgoing call, a channel is scanned by the cordless fixed part, a received field strength is compared with a communication field strength. If the received field strength is more than the communication field strength, the received field strength is stored and a determination is made as to whether or not link-request data has been received during a given period of time. If the link-request data has been received during the given period of time, a determination is made as to whether or not the received field strength is more than a near-far field strength and if received field strength is more than the near-far field strength, a link-grant is transmitted to the cordless portable part. If the received field strength is less than the near-far field strength, a received cordless portable part ID is compared with a cordless portable part ID of link-request data which has been previously received and stored in a memory, and a count in a corresponding counter is increased when the received cordless portable part ID is equal to the cordless portable part ID of the link-request data. The increased count in the counter with a predetermined count the predefined counter, and a link-grant is transmitted to the cordless portable part when the increased count is more than the predetermined count.

5 Claims, 7 Drawing Sheets

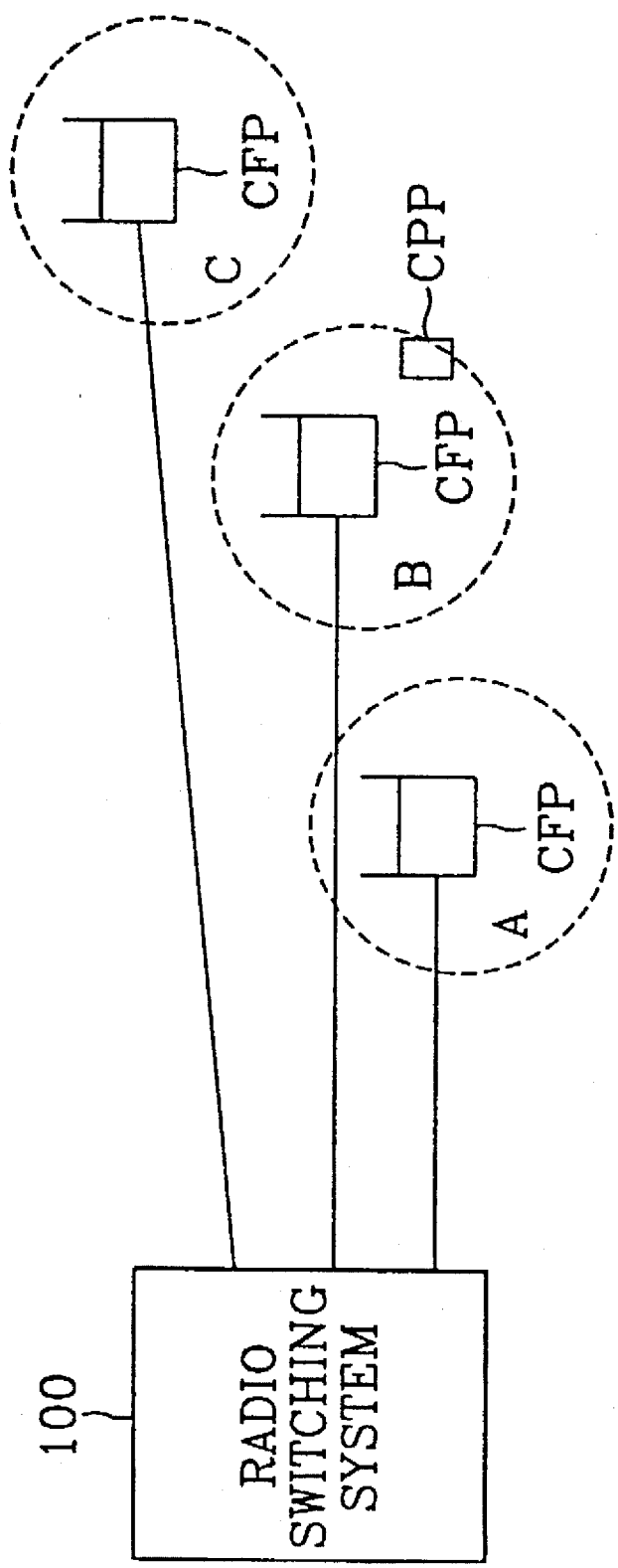

RADIO CALLING METHOD AND APPARATUS FOR REMOVING NEAR-FAR PROBLEM

CROSS REFERENCE TO RELATED APPLICATIONS

This application make reference to, incorporates the same herein, and claims all benefits accruing under 35 U.S.C §119 from an application entitled RADIO CALLING METHOD FOR REMOVING NEAR-FAR PROBLEM earlier filed in the Korean Industrial Property Office on 17 Jun. 1995 and assigned Ser. No. 16183/1995.

BACKGROUND OF THE INVENTION

1. Field of the Invention

The present invention relates to a method and apparatus for improving the quality of mobile communication in a radio switching system and, more particularly, to a method and apparatus for effecting a high-quality calling service by removing a near-far problem in a radio station.

2. Description of the Related Art

In a conventional local radio switching system, each cell may contain two or three cordless fixed parts (often referred to as CFP) which are grouped together. In the event that a cordless portable part (often known as a CPP) is disposed between two groups and is closer to one of the two groups, it is natural that the group closest to the cordless portable part should be selected when the cordless portable part attempts an outgoing call. That is not always the case however. If the closest group is not selected, but rather the cordless fixed part belonging to another group that is selected, the reception sensitivity may be deteriorated and the quality of the call may not be optimum. Thus, in order to improve the quality of the call, it is necessary to remove the near-far problem occurring in prior art radio systems.

Contemporary efforts, as represented by two patents to Patsiokas, et al., U.S. Pat. No. 5,203,012 for Method and Apparatus for Optimum Channel Assignment, and U.S. Pat. No. 5,396,648 for Channel Acquisition Method and Apparatus for Communication System, and the more recent efforts described in a patent to Pickert, U.S. Pat. No. 5,465,397 for Method and Apparatus for Selecting the Best Fixed Communication Unit, have endeavored to provide a process and apparatus for selecting the best fixed communication unit. In most of these efforts, threshold detection of signal strength and optimize the fixed communication unit have been used. None of these efforts however, have been able to recognize and remove a near-far problem of communications by a radio station, which has a tendency to adversely affect a high quality calling service.

SUMMARY OF THE INVENTION

It is therefore an object of the present invention to provide an improved process and circuit for a radio.

It is another object to provide a radio calling apparatus and method for removing a near-far problem in a radio station, by which a high quality calling service can be effected.

These and other objects can be achieved according to the principles of the present invention with a radio calling apparatus and process for removing a near-far problem in a radio switching system which groups a plurality of cordless fixed parts distributed in various areas together into at least first and second groups, and controls communication of the at least first and second groups with a cordless portable part. Initially if a cordless portable part disposed between a first group and a second group attempts an outgoing call, a channel is scanned by a cordless fixed part belonging to each group for the purpose of finding the channel where the cordless portable part has attempted to transmit the outgoing call, fixing the frequency of the cordless fixed parts at that channel and comparing a received field strength with a communication field strength; if the received field strength is more than the communication field strength, the received field strength is stored and a determination is made as to whether or not link-request data has been received during a given period of time; if the link-request data has been received during a given period of time, a determination is made as to whether or not the received field strength is more than a near-far field strength and, if the received field strength is more than the near-far field strength, a link-grant is transmitted to the cordless portable part which has attempted the outgoing call; and if the received field strength is less than the near-far field strength, a received cordless portable part ID is compared with a cordless portable part ID of the link-request data which has been previously received and stored in a memory, and a count in a corresponding counter is increased when the received cordless portable part ID is equal to the cordless portable part ID of the link-request data; then, the increased count in the counter is compared with a predetermined count, and a link-grant is transmitted to the cordless portable part which has attempted the outgoing call, when the increased count in the counter is more than the predetermined count.

Further, the present invention can be embodied with a radio calling apparatus and method for removing a near-far problem in a radio switching system for grouping a plurality of cordless fixed parts distributed in various areas into at least first and second groups and controls the communication of the groups with a cordless portable part. Initially, if a cordless portable part disposed between a first group and a second group attempts an outgoing call, a channel is scanned by the cordless fixed part belonging to each group for the purpose of finding the channel where the cordless portable part has attempted to transmit the outgoing call, fixing the frequency of the cordless fixed parts at that channel and comparing a received field strength with a communication field strength. If the received field strength is more than a communication field strength, the received field strength is stored and a determination is made as to whether or not link-request data has been received during a given period of time. If the link-request data has been received during the given period of time, a determination is made as to whether or not the received field strength is more than a near-far field strength and if the received field strength is more than the near-far field strength, a link-grant is transmitted to the cordless portable part which has attempted the outgoing call. If however, the received field strength is less than the near-far field strength, a received cordless portable part ID is compared with a cordless portable part ID of the link-request data that has been previously received and stored in a memory, and a determination is made about whether or not a time-out of a corresponding timer has occurred when the received cordless portable part ID is equal to the cordless portable part ID of the link-request data, and a link-grant is transmitted to the cordless portable part that has attempted the outgoing call when the time-out of the corresponding timer has occurred.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein:

FIG. 1A is an abstract representation illustrating the construction of a general local radio switching system;

DETAILED DESCRIPTION OF THE PREFERRED EMBODIMENTS

Figure 1B:
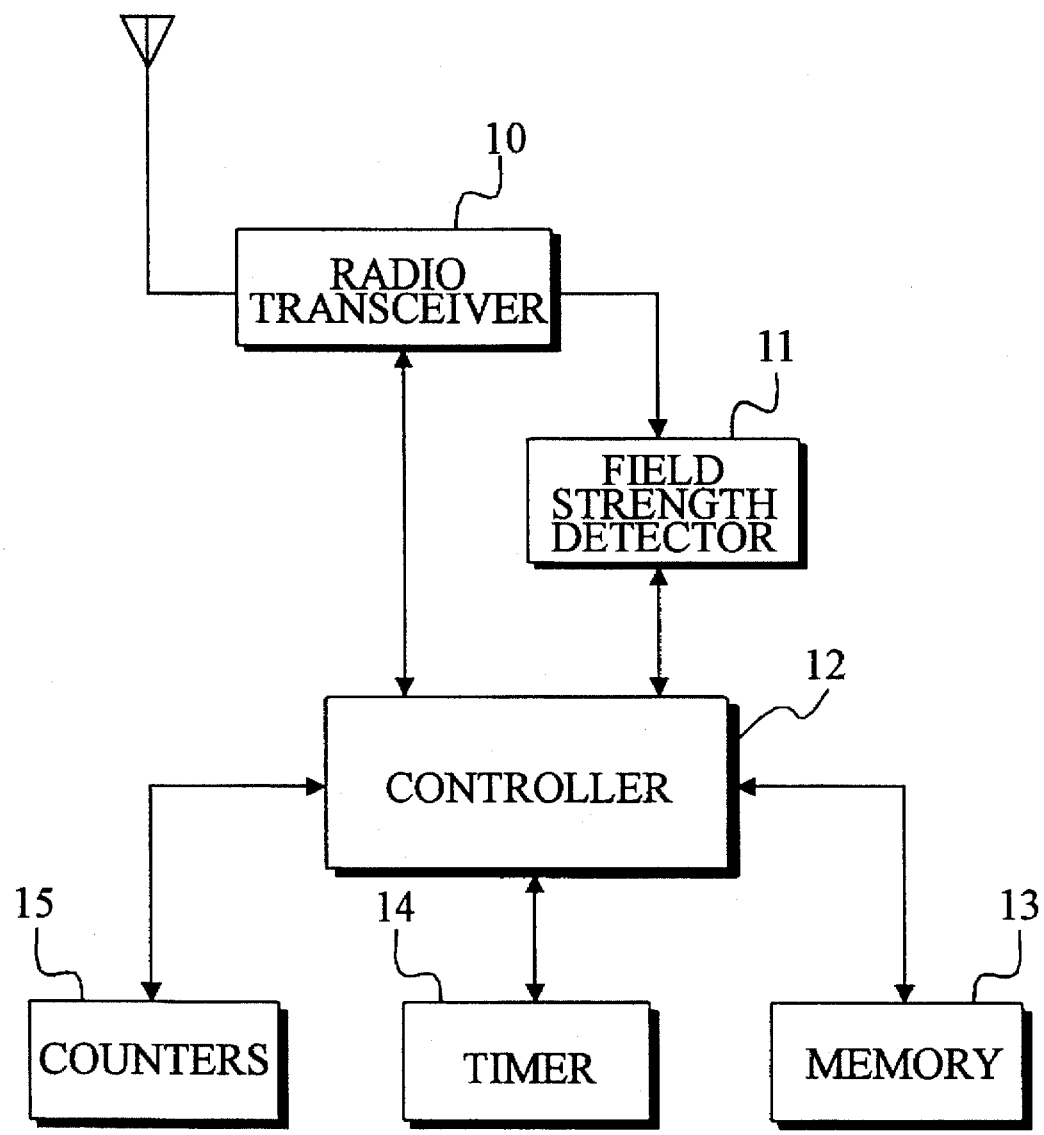
FIGS. 1B and 1C are block diagrams of two systems showing two embodiments constructed in accordance with the principles of the present invention.

Throughout the drawings, it is noted that the same reference numerals of letter will be used to designate like or equivalent elements having the same function. Furthermore, in the following description, specific details such as concrete components composing the circuits and the frequencies, have been set forth to provide a more through understanding of the present invention. It will be apparent, however, to one skilled in the art that the present invention may be practiced without these specific details. A detailed description of known functions and constructions necessarily obscuring the subject matter of the present invention have been omitted in the present application for clarity.

In general, a local radio switching system is operated by installing a cordless fixed part CFP as a unit of a cell. FIG. 1 is a view illustrating the construction of a general local radio switching system, where two or three cordless fixed parts CFP are grouped together to thereby form a cell. Each cordless fixed part CFP initially sets a least field strength for calling (i.e., a communication RSSI) and a field strength for identification of it's area (i.e., a near-far RSSI). Hereinbefore, the RSSI referred to is "a received signal strength indication". In the event that a cordless portable part CPP disposed between groups B and C attempts an outgoing call, it is natural that group B should be selected because group B is nearest to the cordless portable part CPP. Even so, that is not the case. In reality, often group A or group C rather than group B is selected. The reason is that the cordless fixed parts CFP respectively have separate steps of generating a period for channel scanning and a random number and of selecting a channel number. As described above, if the cordless fixed part CFP belonging to the group located position to the cordless portable part CPP is not selected, but rather, the cordless fixed part CFP belonging to another group is selected, the reception sensitivity may be deteriorated. Thus, the quality of the call may not be optimum. In other words, if group B is not selected and group A or group C is selected, the quality of the call in group A or group C can may lower than that in group B. Hence, in order to improve the qualify of the call, it is necessary to remove a near-far problem in the radio switching system.

FIG. 1B is a block diagram of a system constructed in accordance with one embodiment of the present invention. An antenna is connected to a radio transceiver 10 which is connected to a controller 12. A field strength detector 11 is connected to the transceiver 10 to detect the field strength of an incoming signal and output the value of the field strength to the controller 12. A memory 13, a timer 14, and counters 15 are all connected to the controller 12.

Figure 1C:
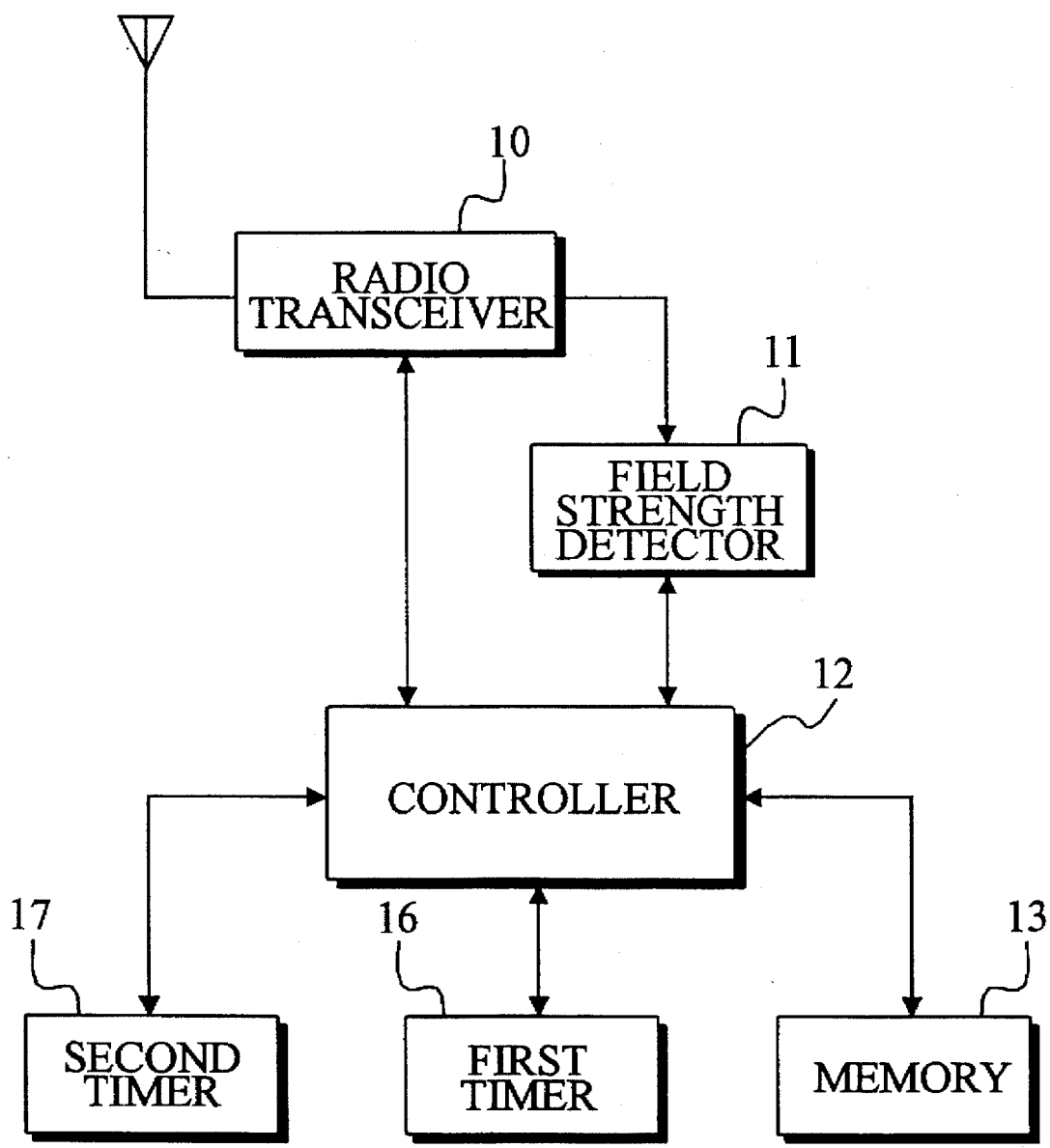
Figure 2A:
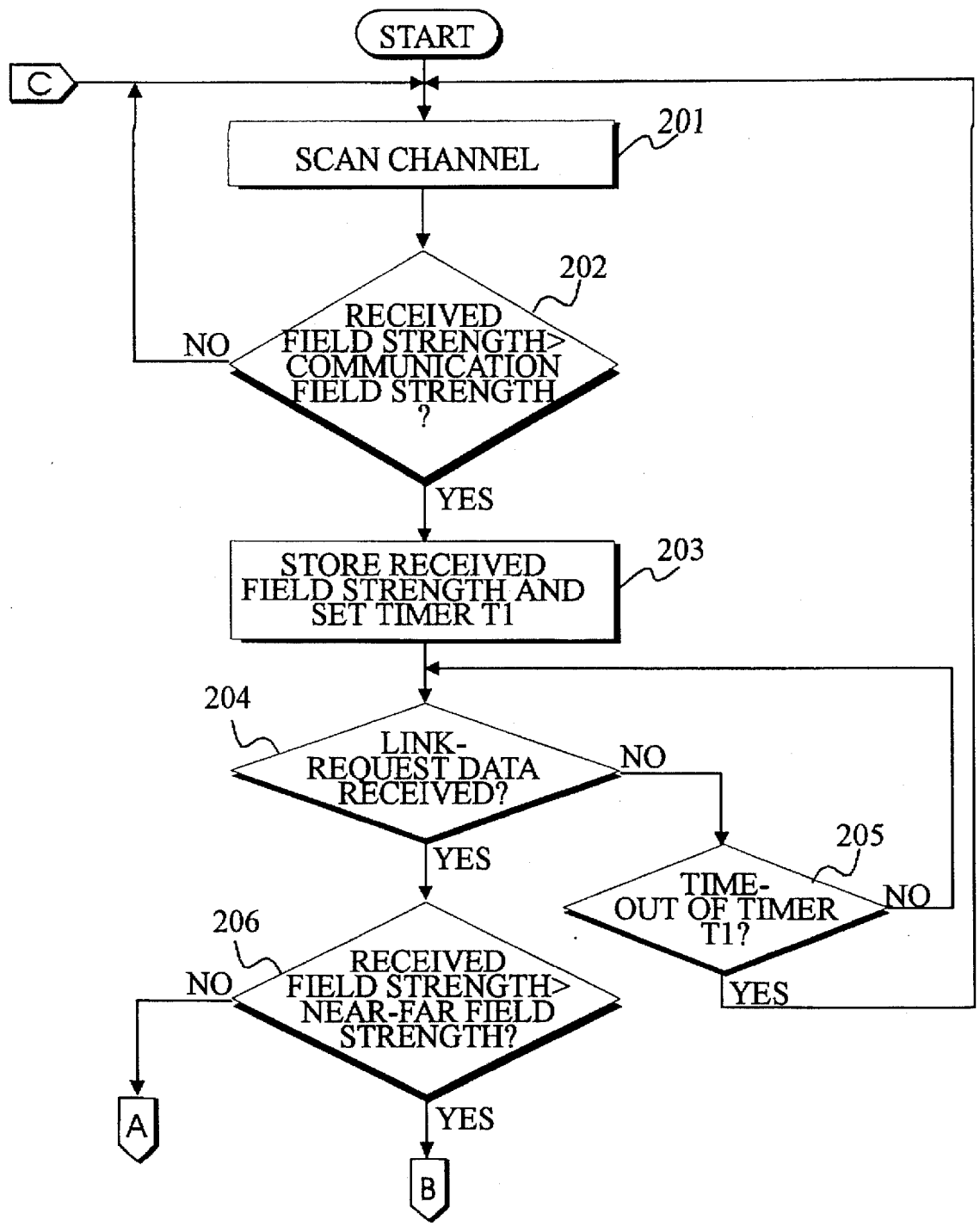
FIGS. 2A and 2B together form a flowchart illustrating the steps of setting up a link between a cordless portable part and a cordless fixed part as shown in FIG. 1, which is constructed as an embodiment of the present invention.
Figure 2B:
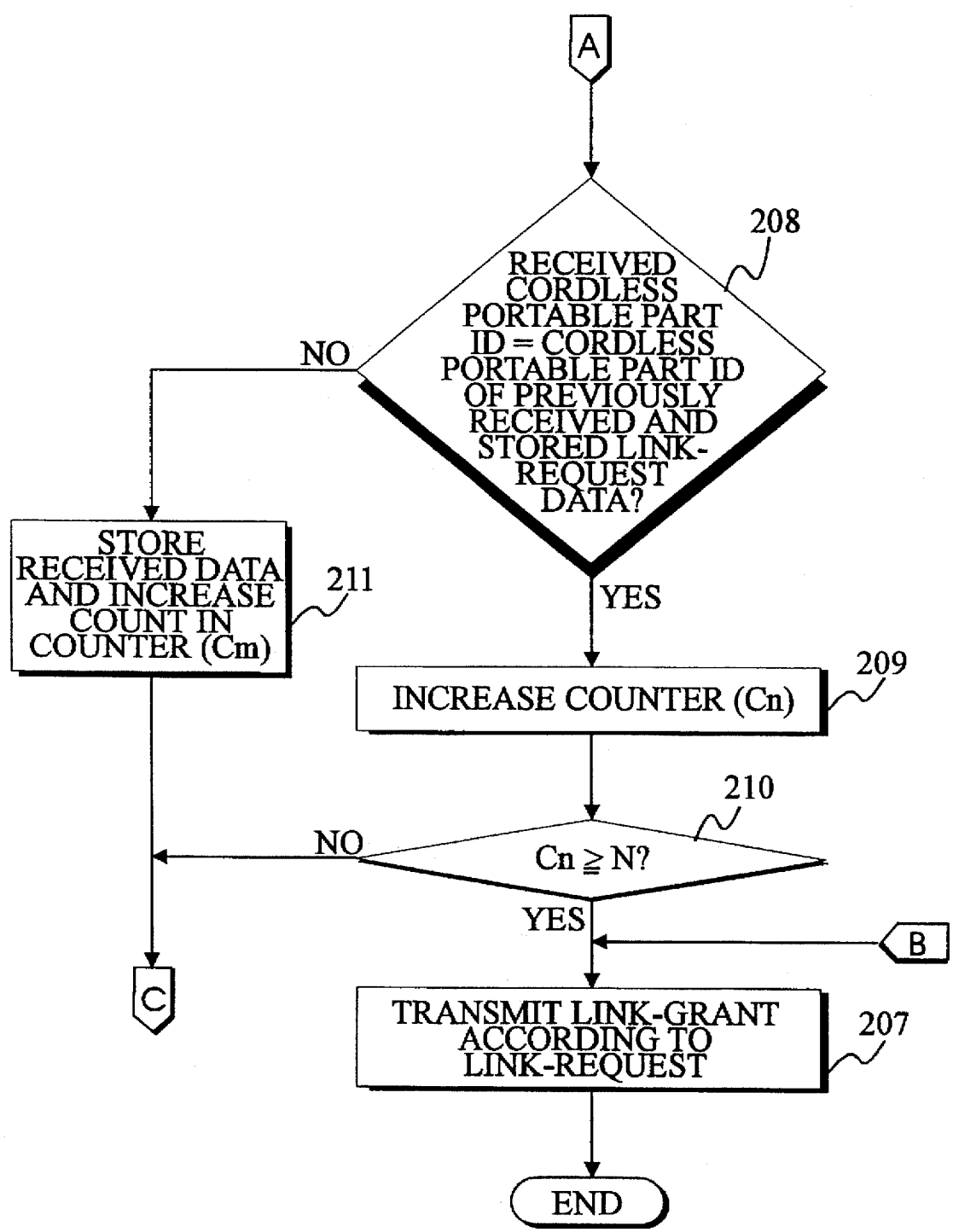

FIGS. 2A and 2B together form a flowchart illustrating the steps of setting a link between a cordless portable part CPP and a cordless fixed part CFP as shown in FIG. 1, which is constructed as an embodiment of the present invention as illustrated in FIG. 1B. When the cordless portable part CPP located between groups B and C attempts a link-request, in step 201, the cordless fixed part CFP belonging to each group scans a channel. In step 202, in order to find the channel where the cordless portable part CPP has attempted to transit the outgoing call, the cordless fixed part CFP compares the field strength which is received at a random channel corresponding to a channel range of 1–40 with the communication field strength. As a result of the above comparison, when it has been determined that the received field strength is less than the communication field strength, the cordless fixed part CFP returns to step 201. Thus, the cordless fixed part CFP determines that no outgoing call exists or that the cordless portable part CPP and the cordless fixed part CFP are not located at a distance capable of effecting a call therebetween, thereby providing no calling service. When it has been determined that the received field strength is more than the communication field strength, in step 203, the cordless fixed part CFP stores the field strength and sets a timer T1 (i.e., element 14 in FIG. 1B) for finding the link-request data during a given period of time. After that, in step 204, the cordless fixed part CFP determines whether or not the link-request data has been received. If the link-request data has not been received, the cordless fixed part CFP determines, in step 205, whether or not a time-out of the preset timer T1 has occurred. If the time-out of the preset timer T1 has occurred, the cordless fixed part CFP returns to step 201. On the other hand, if the time-out of the preset timer T1 has not occurred, the cordless fixed part CFP returns to step 204 and waits to receive the link-request data until the time-out of the preset timer T1 occurs. In step 204, once the link-request data has been received, the cordless fixed part CFP determines, in step 206, whether or not the received field strength is more than a near-far field strength. Upon a determination that the received field strength was more than the near-far field strength, the cordless fixed part CFP, in step 207, transmits the link-grant to the cordless portable part CPP that has attempted the outgoing call. Alternatively, upon a determination that the received field strength is less than the near-far field strength, the cordless fixed part CFP, in step 208, compares a received cordless portable part ID with a cordless portable part ID of the link-request data that has been previously received and stored in a memory (e.g., element 13 of FIG. 1B). As a consequence, if the received cordless portable part ID is equal to the cordless portable part ID of the link-request data, in step 209, the cordless fixed part CFP increases the count in a corresponding counter Cn (i.e., element 15 of FIG. 1B). In step 210, the cordless fixed part CFP compares the increased count in the counter Cn with a predetermined count N. If the increased count in the counter Cn is more than the count N, then the cordless fixed part CFP returns to step 207, thereby providing the calling service. Otherwise, in the event that the increased count in the counter Cn is less than the count N, then the cordless fixed part CPP proceeds to step 201. Further, as a result of comparison in step 208, if the received cordless portable part ID is not equal to the cordless portable part ID of the link-request data which has been previously received and stored in the memory, then the cordless fixed part CFP proceeds to step 211. In step 211, the cordless fixed part CFP stores the received data in a new link-request memory area, sets the count in a new counter Cm, and increases the count in the counter Cm (i.e., element 15 of FIG. 1B). Thereafter, the cordless fixed part CFP returns to step 201. As described above, FIGS. 2A and 2B illustrate counting the received data and determine whether or not the calling service is to be provided.

FIG. 1C is a block diagram of a system in accordance with another embodiment of the present invention. The system represented by FIG. 1C differs from the system shown in FIG. 1B because timer 14 of the system shown in FIG. 1B has been replaced by a first timer 16 and a second timer 17. Additionally, the counters 15 of FIG. 1B are not utilized in the embodiment illustrated in FIG. 1C.

Figure 3A:
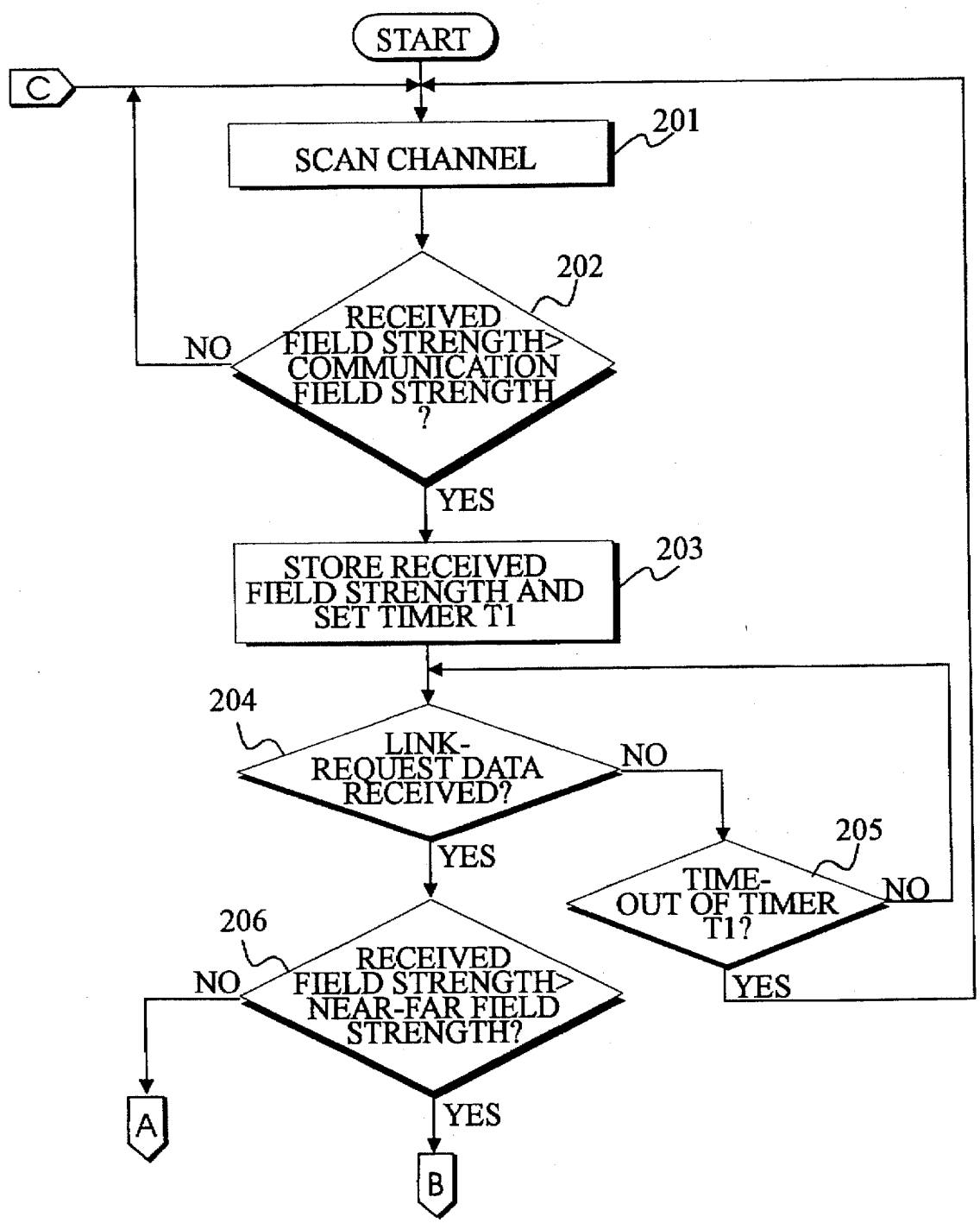
FIGS. 3A and 3B together form a flowchart illustrating the steps of setting up a link between a cordless portable part and a cordless fixed part as shown in FIG. 1, which is constructed as another embodiment of the present invention.
Figure 3B:
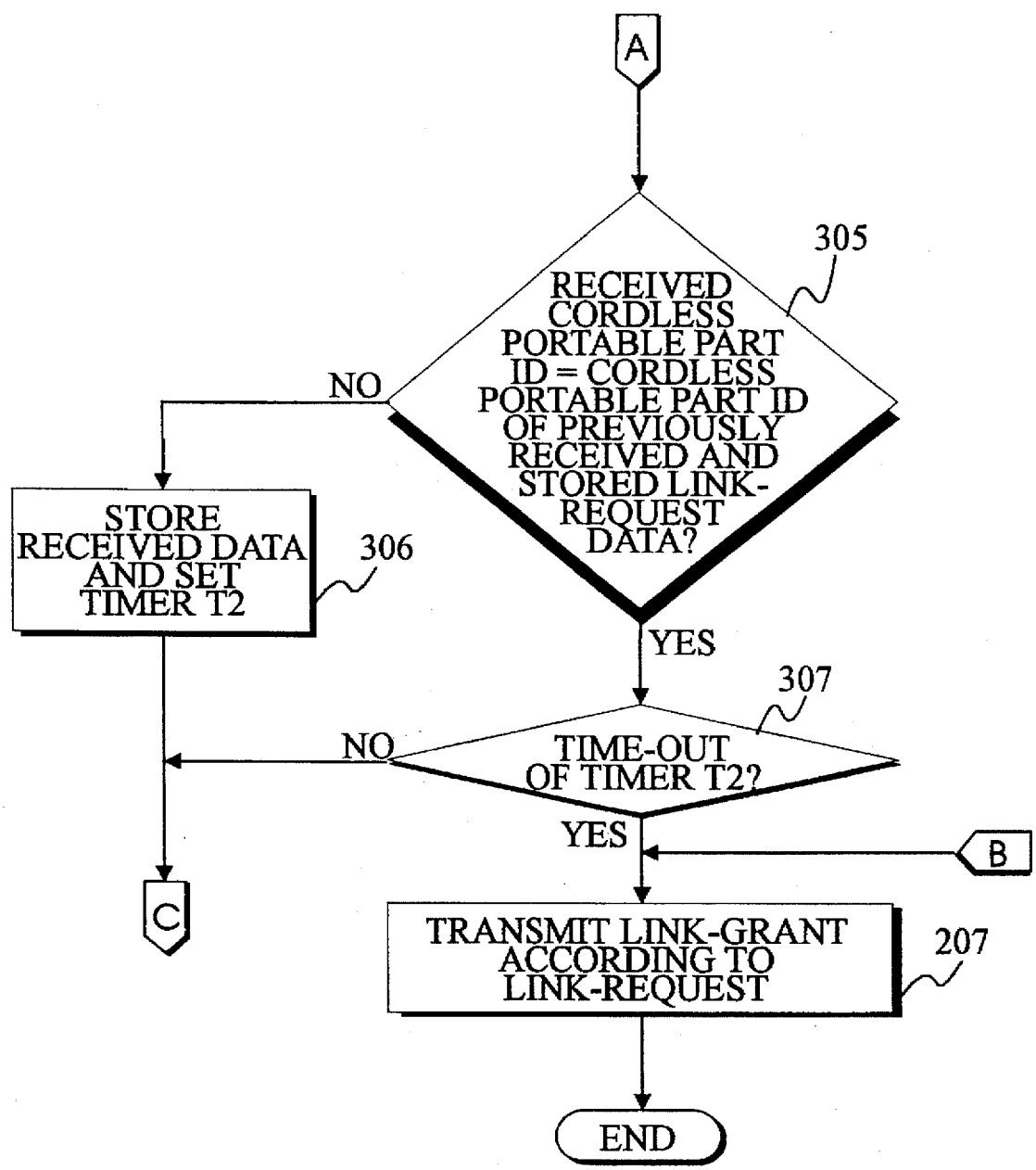

FIGS. 3A and 3B form a flowchart illustrating the steps of setting a link between a cordless portable part and a cordless fixed part as shown in FIG. 1, which is constructed as another embodiment of the present invention. The operations of steps 201 to 205 as shown in FIG. 3A are the same as those of steps 201 to 205 as shown in FIG. 2A. Also, upon a determination, in step 206, that the received field strength was more than the near-far field strength, the operation of proceeding to step 207 as shown in FIGS. 3A-3B is the same as that shown in FIG. 2A-2B.

Upon a determination in step 206 however, that the received field strength was less than the near-far field strength, the cordless fixed part CFP proceeds to step 305 and determines whether or not the received cordless portable part ID is equal to the cordless portable part ID of the link-request data which has been previously received and stored in the link-request data memory. If the received cordless portable part ID was not equal to the cordless portable part ID of the link-request data that has been previously received and stored in the link-request data memory, the cordless fixed part CFP, in step 306, stores the received data and sets a new timer T2 (i.e., element 17 of FIG. 1C), and then returns to step 201. On the other hand, when the received cordless portable part ID was equal to the cordless portable part ID of the link-request data which has been previously received and stored in the link-request data memory, then the cordless fixed part CFP determines, in step 307, whether or not a time-out of the corresponding timer T2 has occurred. Upon a determination that the time-out of the corresponding timer T2 has occurred, the cordless fixed part CFP proceeds to step 207 and transmits the link-grant to the cordless portable part CPP which has attempted the link-request. On the contrary, upon a determination that the time-out of the corresponding timer T2 has not occurred, the cordless fixed part CFP proceeds to step 201. As mentioned previously, once the same data has been continuously received during the given waiting time, the steps of setting the line between the cordless portable part CPP and the cordless fixed part CFP in FIGS. 3A-3B is for effecting a calling service after the given time.

Once the cordless portable part CPP that is positioned between the groups B and C as shown in FIG. 1 has requested a calling service, as long as the cordless fixed part CFP in group B is available, there is no connection of the calling path to the cordless portable part CPP of group C. If the cordless fixed part CFP belonging to group B is on-line or can not provide the calling service for any particular reason, the cordless portable part CPP and the group C or the group A are capable of being connected to each other and a calling service therebetween is therefore possible.

As apparent from the foregoing, since the present invention enables the calling path and the cordless fixed part belonging to the group which is nearest to the cordless portable part to be connected to each other, no near-far problem occurs, thereby providing a calling service of a high quality to a user.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention is not to be limited to the particular embodiments disclosed as the best mode contemplated for carrying out the present invention, but the present invention includes all if the embodiments falling within the scope of the appended claims.

What is claimed is:

1. A radio calling method for removing a near-far problem in a radio switching system which groups a plurality of cordless fixed parts distributed in various areas at least first and second groups and controls communication of the groups with a cordless portable part, which is comprised of the steps of:

(a) when a cordless portable part disposed between a first group and a second group attempts an outgoing call, scanning a channel by the cordless fixed part belonging to each group for the purpose of finding the channel where the cordless portable part has attempted to transmit the outgoing call;

(b) fixing the frequency of the cordless fixed parts at that channel and comparing a received field strength with a predetermined communication field strength;

(c) when the received field strength is more than the communication field strength, storing the received field strength and determining whether or not link-request data has been received during a given period of time;

(d) when the link-request data has been received during the given period of time, determining whether or not the received field strength is more than a predetermined near-far field strength and, when the received field strength is more than the near-far field strength, transmitting a link-grant to the cordless portable part which has attempted the outgoing call; and (e) when the received field strength is less than the near-far field strength, comparing a received cordless portable part ID with a cordless portable part ID of link-request data which has been previously received and stored in memory, and increasing count in a corresponding counter when the received cordless portable part ID is equal to the cordless portable part ID of the link-request data, and comparing the increased count in the counter with a predetermined count, and transmitting a link-grant to the cordless portable part which has attempted the outgoing call, when the increased count in the counter is more than the predetermined count.

2. The method as set forth in claim 1, said method further comprising the step of returning to step (a) when the link-request data has not been received during a given period of time.

3. A radio calling method for removing a near-far problem in a radio switching system which groups a plurality of cordless fixed parts distributed in various areas into at least first and second groups and controls communication of the groups with a cordless portable part, which is comprised of the steps of:

(a) when a cordless portable part disposed between a first group and a second group attempts an outgoing call, scanning a channel by the cordless fixed part belonging to each group for the purpose of finding the channel where the cordless portable part has attempted to transmit the outgoing call;

(b) fixing the frequency of the cordless fixed parts at that channel and comparing a received field strength with a predetermined communication field strength;

(c) when the received field strength is more than the communication field strength, storing the received field strength and determining whether or not link-request data has been received during a given period of time;

(d) when the link-request data has been received during the given period of time, determining whether or not the received field strength is more than predetermined a near-far field strength and, when the received field strength is more than the near-far field strength, transmitting a link-grant to the cordless portable part which has attempted the outgoing call; and (e) when the received field strength is less than the near-far field strength, comparing a received cordless portable part ID with a cordless portable part ID of link-request data which has been previously received and stored in a memory, and determining whether or not a time-out of a corresponding timer has occurred when the received cordless portable part ID is equal to the cordless portable part ID of the link-request data, and transmitting a link-grant to the cordless portable part which has attempted the outgoing call, when the time-out of the corresponding timer has occurred.

4. A radio calling apparatus for removing near-far problem in a radio switching system grouping a plurality of cordless fixed parts distributed in various areas in to at least first and second groups and controls communication of the groups with a cordless portable part, said apparatus comprising:

a scanner for scanning a channel of the cordless fixed part belonging to each group for the purpose of find the channel where the cordless portable part, disposed between a first group and a second group, has attempted to transmit an outgoing call;

means for fixing the frequency of the cordless parts at said channel where the cordless portable part has attempted to transmit the outgoing call and for comparing a received field strength with a predetermined communication field strength;

means for storing the received field strength if the received field strength is more than the communication field strength and a means for determining whether or not link-request data has been received during a given period of time;

means for determining whether or not the received field strength is more than a predetermined near-far field strength if the link-request data has been received during the given period of time and for transmitting a link-grant to the cordless portable part which has attempted the outgoing call if the received field strength is more than the near-far field strength;

means for comparing a received cordless portable part ID with a cordless portable part ID of link-request data which has been previously received and stored in a memory if the received field strength is less than the near-far field strength and for increasing a count in a corresponding counter when the received cordless portable part ID is equal to the cordless portable part ID of the link-request data; and means for comparing the increased count in the counter with a predetermined count and for transmitting a link-grant to the cordless portable part which has attempted the outgoing call when the increased count in the counter is more than the predetermined count.

5. A radio switching circuit, comprising:

means for designating a plurality of cordless fixed parts distributed in various different geographical areas into a plurality of groups comprising a first group and a second group, and for controlling communications of said groups with a cordless portable part;

means for scanning a channel for a cordless fixed part belonging to each group, and for finding a channel where the cordless portable part has attempted to transmit an outgoing call, while the cordless portable part is disposed between said first and the second groups;

means for fixing a frequency of the cordless fixed parts at the channel where the cordless portable part has attempted to transmit said outgoing call and for comparing a received field strength with a predetermined communication field strength;

means for storing said received strength and for determining whether link-request data has been received during a given period of time when said received field strength is more than said communication field strength;

means for determining whether said received field strength is more than a predetermined near-far field strength when said link-request data has been received during a given period of time and, for transmitting a link-grant to the cordless portable part that has attempted said outgoing call when said received field strength is greater than said near-far field strength;

means for comparing a received cordless portable part ID with a second cordless portable part ID for link-request data that has previously been received and stored in a memory when said received field strength is less than said near-far field strength, and for determining whether a time-out of a corresponding timer has occurred when said received cordless portable part ID is equal to said second cordless portable port ID of the link-request data; and means for transmitting a link-grant to the cordless portable part that has attempted the outgoing call when the time-out of the corresponding timer has occurred.

* * * * *